(12) United States Patent
Fang et al.

(10) Patent No.: US 11,069,033 B2
(45) Date of Patent: Jul. 20, 2021

(54) NEURAL NETWORK EVOLUTION USING EXPEDITED GENETIC ALGORITHM FOR MEDICAL IMAGE DENOISING

(71) Applicant: University of Florida Research Foundation, Inc., Gainesville, FL (US)

(72) Inventors: Ruogu Fang, Gainesville, FL (US); Peng Liu, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 93 days.

(21) Appl. No.: 16/558,779

(22) Filed: Sep. 3, 2019

(65) Prior Publication Data

US 2020/0082507 A1 Mar. 12, 2020

Related U.S. Application Data

(60) Provisional application No. 62/728,995, filed on Sep. 10, 2018.

(51) Int. Cl.
*G06T 7/00* (2017.01)
*G06N 3/12* (2006.01)
*G06F 17/15* (2006.01)
*G06N 3/04* (2006.01)
*G06T 5/00* (2006.01)

(52) U.S. Cl.
CPC .............. *G06T 5/002* (2013.01); *G06F 17/15* (2013.01); *G06N 3/04* (2013.01); *G06N 3/126* (2013.01); *G06T 7/0012* (2013.01); *G06T 2207/10081* (2013.01); *G06T 2207/10088* (2013.01); *G06T 2207/10116* (2013.01)

(58) Field of Classification Search
None
See application file for complete search history.

(56) References Cited

U.S. PATENT DOCUMENTS

2008/0265130 A1* 10/2008 Colomb .............. G03H 1/0866
250/201.9
2010/0020208 A1* 1/2010 Barbu ...................... G06K 9/40
348/250

(Continued)

OTHER PUBLICATIONS

Jonatas Lopes de Paiva, Claudio F.M. Toledo, Helio Pedrini, "An approach based on hybrid genetic algorithm applied to image denoising problem" in Applied Soft Computing, vol. 46, Sep. 2016, pp. 778-791. (Year: 2016).*

(Continued)

*Primary Examiner* — Idowu O Osifade
(74) *Attorney, Agent, or Firm* — Thomas | Horstemeyer, LLP

(57) ABSTRACT

Various embodiments for image denoising using a convolutional neural network (CCN) are described. A system may include at least one computing device and program instructions stored in memory and executable in the at least one computing device that, when executed, direct the at least one computing device to implement a genetic algorithm (GA) routine that identifies and optimizes a plurality of hyperparameters for use in denoising an image using the convolutional neural network. An image may be denoised using the convolutional neural network, where the image is denoised using the hyperparameters identified and optimized in the genetic algorithm routine.

20 Claims, 13 Drawing Sheets

(56) References Cited

U.S. PATENT DOCUMENTS

| | | | |
|---|---|---|---|
| 2016/0361041 A1* | 12/2016 | Barsimantov | G16H 50/30 |
| 2018/0235562 A1* | 8/2018 | Petschke | A61B 6/032 |
| 2019/0012774 A1* | 1/2019 | Arai | G06N 3/0454 |
| 2019/0108904 A1* | 4/2019 | Zhou | G06N 3/08 |
| 2019/0180860 A1* | 6/2019 | Bronkalla | G06T 7/11 |
| 2019/0365341 A1* | 12/2019 | Chan | G06T 7/0012 |
| 2020/0167914 A1* | 5/2020 | Stamatoyannopoulos | G06N 20/00 |
| 2020/0320701 A1* | 10/2020 | Xiao | G06T 7/0012 |

OTHER PUBLICATIONS

Baker, B.; et al (2016) "Designing Neural Network Architectures Using Reinforcement Learning." pp. 1-18 arXiv preprint arXiv:1611.02167.
Britten, A.J.; et al (2004) "The Addition of Computer Simulated Noise to Investigate Radiation Dose and Image Quality in Images With Spatial Correlation of Statistical Noise: An Example Application to X-ray CT of the brain." The British journal of radiology, 77(916), pp.323-328.
Chen, F.; et al (2015) "External Patch Prior Guided Internal Clustering for Image Denoising." In Proceedings of the IEEE international conference on computer vision pp. 603-611.
Cortes, C.; et al (1995) "Support-Vector Networks." Machine learning, 20(3), pp. 273-297.
Dabov, K.; et al (2009) "BM3D Image Denoising With Shape-Adaptive Principal Component Analysis." HAL archives—ouvertes.
Elad, M.; et al (2006) "Image Denoising Via Sparse and Redundant Representations Over Learned Dictionaries." IEEE Transactions on Image processing, 15(12), pp. 3736-3745.
Van den Elsen, P.A.; et al (1993) "Medical Image Matching—A Review With Classification." IEEE Engineering in Medicine and Biology Magazine, 12(1), pp. 26-39.
Feurer, M.; et al (2015) "Efficient and Robust Automated Machine Learning." In Advances in neural information processing systems pp. 2962-2970.
Geem, Z.W.; et al (2001) "A New Heuristic Optimization Algorithm: Harmony Search." simulation, 76(2), pp. 60-68.
Goldberg, D.E.; et al (1988) "Genetic Algorithms and Machine Learning." Machine learning, 3(2), pp. 95-99.
Goodfellow, I.; et al (2014) "Generative Adversarial Nets." In Advances in neural information processing systems pp. 2672-2680.
Gu, S.; et al (2014) "Weighted Nuclear Norm Minimization With Application to Image Denoising." In Proceedings of the IEEE conference on computer vision and pattern recognition pp. 2862-2869.
He, K.; et al (2016) "Deep Residual Learning for Image Recognition." In Proceedings of the IEEE conference on computer vision and pattern recognition pp. 770-778.
Ho, T.K., (1995) "Random Decision Forests." In Proceedings of 3rd international conference on document analysis and recognition vol. 1, pp. 278-282. IEEE.
Zhang, K.; et al (2017) "Beyond a Gaussian Denoiser: Residual Learning of Deep cnn for Image Denoising." IEEE Transactions on Image Processing, 26(7), pp. 3142-3155.
Hore, A.; et al (2010) "Image Quality Metrics: PSNR vs. SSIM." In 2010 20th International Conference on Pattern Recognition pp. 2366-2369. IEEE.
Horn, J.; et al (1994) "A Niched Pareto Genetic Algorithm for Multiobjective Optimization." In Proceedings of the first IEEE conference on evolutionary computation, IEEE world congress on computational intelligence vol. 1, pp. 82-87.
Jifara, W.; et al (2017) "Medical Image Denoising Using Convolutional Neural Network: A Residual Learning Approach." The Journal of Supercomputing, 75(2), pp. 704-718.
Joachims, T. (2003) "Transductive Learning Via Spectral Graph Partitioning." In Proceedings of the 20th International Conference on Machine Learning (ICML-03) pp. 290-297.

Johnson, J.; et al (2016) "Perceptual Losses for Real-Time Style Transfer and Super-Resolution." In European conference on computer vision pp. 694-711. Springer, Cham.
Kiku, D.; et al (2013) "Residual Interpolation for Color Image Demosaicking." In 2013 IEEE International Conference on Image Processing pp. 2304-2308. IEEE.
Kingma, D.P.; et al (2014) "Adam: A Method for Stochastic Optimization." arXiv preprint arXiv:1412.6980.
Klein, A.; et al (2016) "Fast Bayesian Optimization of Machine Learning Hyperparameters on Large Datasets." arXiv preprint arXiv:1605.07079.
Li, Q.; et al (2014) "Medical Image Classification With Convolutional Neural Network." In 2014 13th International Conference on Control Automation Robotics & Vision (ICARCV) pp. 844-848. IEEE.
Li, S.; et al (2012) "Group-Sparse Representation With Dictionary Learning for Medical Image Denoising and Fusion." IEEE Transactions on biomedical engineering, 59(12), pp. 3450-3459.
Liu P.; et al (2018) "SDCNet: Smoothed Dense-Convolution Network for Restoring Low-Dose Cerebral CT Perfusion." In 2018 IEEE 15th International Symposium on Biomedical Imaging (ISBI 2018) pp. 349-352. IEEE.
Liu, P.; et al (2018) "Neural Network Evolution Using Expedited Genetic Algorithm for Medical Image Denoising." In International Conference on Medical Image Computing and Computer-Assisted Intervention pp. 12-20. Springer, Cham.
Mao, X.J.; et al (2016) "Image Restoration Using Convolutional Auto-Encoders With Symmetric Skip Connections." arXiv preprint arXiv:1606.08921.
Mikolov, T.; et al (2010) "Recurrent Neural Network Based Language Model." In Eleventh annual conference of the international speech communication association.
Miller, J.; et al (2015) "Cartesian Genetic Programming." In Proceedings of the Companion Publication of the 2015 Annual Conference on Genetic and Evolutionary Computation pp. 179-198. ACM.
Milletari, F.; et al (2016) "V-net: Fully Convolutional Neural Networks for Volumetric Medical Image Segmentation." In 2016 Fourth International Conference on 3D Vision (3DV) pp. 565-571. IEEE.
Nair, V.; et al (2010) "Rectified Linear Units Improve Restricted Boltzmann Machines." In Proceedings of the 27th International conference on machine learning (ICML-10) pp. 807-814.
Olson, R.S.; et al (2019) "TPOT: A Tree-Based Pipeline Optimization Tool for Automating Machine Learning." In Automated Machine Learning pp. 151-160. Springer, Cham.
Pham, D.L.; et al (2000) "Current Methods in Medical Image Segmentation." Annual review of biomedical engineering, 2(1), pp. 315-337.
Real, E.; et al (2019) "Regularized Evolution for Image Classifier Architecture Search." In Proceedings of the AAAI Conference on Artificial Intelligence vol. 33, pp. 4780-4789.
Real, E.; et al (2017) "Large-Scale Evolution of Image Classifiers." In Proceedings of the 34th International Conference on Machine Learning—vol. 70 pp. 2902-2911. JMLR. org.
Sajjadi, M.S.; et al (2017) "Enhancenet: Single Image Super-Resolution Through Automated Texture Synthesis." In Proceedings of the IEEE International Conference on Computer Vision pp. 4491-4500.
Stanley, K.O.; et al (2002) "Evolving Neural Networks Through Augmenting Topologies." Evolutionary computation, 10 (2), pp. 99-127.
Suganuma, M.; et al (2017) "A Genetic Programming Approach to Designing Convolutional Neural Network Architectures." In Proceedings of the Genetic and Evolutionary Computation Conference pp. 497-504. ACM.
Szegedy, C.; et al (2015) "Going Deeper With Convolutions." In Proceedings of the IEEE conference on computer vision and pattern recognition pp. 1-9.
Torrey, L.; et al (2010) "Transfer Learning." In Handbook of research on machine learning applications and trends: algorithms, methods, and techniques pp. 242-264. IGI Global.

(56) References Cited

OTHER PUBLICATIONS

Van Leemput, K.; et al (2001) "Automated Segmentation of Multiple Sclerosis Lesions by Model Outlier Detection." IEEE transactions on medical imaging, 20(8), pp. 677-688.

Wang, Y.; et al (2006) "Total Variation Wavelet-Based Medical Image Denoising." International Journal of Biomedical Imaging.

Whitaker, R.T.; et al (2001) "Variable-Conductance, Level-Set Curvature for Image Denoising." In Proceedings 2001 International Conference on Image Processing (Cat. No. 01CH37205) vol. 3, pp. 142-145. IEEE.

Xie, L.; et al (2017) "Genetic Cnn." In Proceedings of the IEEE International Conference on Computer Vision pp. 1379-1388.

Yang, J.; et al (1998) "Feature Subset Selection Using a Genetic Algorithm." In Feature extraction, construction and selection pp. 117-136. Springer, Boston, MA.

Yao, X., (1999) "Evolving Artificial Neural Networks." Proceedings of the IEEE, 87(9), pp. 1423-1447.

Yosinski, J.; et al (2014) "How Transferable are Features in Deep Neural Networks?." In Advances in neural information processing systems pp. 3320-3328.

Youssef, H.; et al (2001) "Evolutionary Algorithms, Simulated Annealing and Tabu Search: A Comparative Study." Engineering Applications of Artificial Intelligence, 14(2), pp. 167-181.

Holland, J.H. (1992) "Genetic algorithms." Scientific american, 267(1), pp. 66-73.

Zoph, Barret; et al (2016) "Neural Architecture Search With Reinforcement Learning." arXiv preprint arXiv:1611.01578.

Goldberg, D.E.; et al (1987) "Genetic Algorithms With Sharing for Multimodal Function Optimization." In Genetic algorithms and their applications: Proceedings of the Second International Conference on Genetic Algorithms pp. 41-49.

Parikh, T.,; et al (2008) "Focal Liver Lesion Detection and Characterization with Diffusion-Weighted MR Imaging: Comparison with Standard Breath-Hold T2-Weighted Imaging." Radiology, 246(3), pp. 812-822.

Sutton, R.S.; et al (1998) "Reinforcement Learning: An Introduction MIT Press." Cambridge, MA.

\* cited by examiner

Algorithm 1 The Proposed Genetic Algorithm for Exploring CNNs

Input: one all-possible-gene set $\theta = \theta_c \cup \theta_f$, initial fine-gene set $\theta_f$, initial complementary-gene set $\theta_c$, initial population size $N$, initial number of generation $G$, percentage of selected individuals after each generation $\sigma$, number of children of crossed over out $O$, mutation rate $\epsilon$, termination condition $E$, small and large training datasets $D = \{D_s, D_l\}$ 1: for d = 1, 2, ..., length(D) do
2:    for g = 1, 2, ..., G − 1 do
3:       for i = 1, 2, ..., N do
4:          if $g = 1$ then
5:             *Initialize* a set of randomized individuals $\{P_i^g\}_{i=1}^N$ based on $\theta_f$
6:          end if
7:          Return *trained* individuals $\{P_i^{g,t}\}_{i=1}^N$ by Keras and Tensorflow
8:          Return *fitness scores* $F_i^g = F(P_i^{g,t})$ to individuals
9:       end for
10:       $Sort\{P_i^{g,trained}\}_{i=1}^N$ by $F_i^g$ with descending order
11:       $\Re = \{P_i^{g,trained,sorted}\}_{i=1}^{N*\sigma}$ Select the top $N * \sigma$ best individuals
12:       $P_i^{g,new} = P_i^{g,new} + = \emptyset$
13:       while $length(P_i^{g,new}) < N - length(\Re)$ do
14:          $\Upsilon_{mom}, \Upsilon_{dad} = uniformRandom(\Re)$ Select parents
15:          $\{\Psi_o\}_{o=1}^O = Genome(\Upsilon_{mom}, \Upsilon_{dad})$ Have children with crossover genes
16:          if $\epsilon > Random(0,1)$ then Mutation with a rate $\mu$
17:             $\Psi_{selected} = selectRandom(\{\Psi_o\}_{o=1}^O)$ Randomly select one child
18:             $\theta_{selected} = selectRandom(\theta_{\Psi_{selected}})$ Randomly select one gene
19:             $\theta_{c,selected} = selectRandom(\theta_c, Genotype(\theta_{selected}))$
20:             $\{\Psi_o^m\}_{o=1}^O = replace(\Psi_{selected}, \theta_{selected}, \theta_{c,selected})$
21:             $P_i^{g,new} = P_i^{g,new} + \{\Psi_o^m\}_{o=1}^O$
22:          else
23:             $P_i^{g,new} = P_i^{g,new} + \{\Psi_o\}_{o=1}^O$
24:         end if
25:          $P_i^{g,new} = removeDuplicate(P_i^{g,new})$
26:       end while
27:       $P_i^{g,new} = P_i^{g,new} + \Re$
28:       if $E = True$ then May say "the highest fitness score is not changing"
29:          Terminate generation and go to output
30:       end if
31:    end for
32:    $\theta_f^u = Update(\theta_f, \Re)$ Replace fine-gene set with the genes in $\Re$
33:    $\theta_c^u = \theta - \theta_f$ Update complementary-gene set
34: end for

Output: Select the best individuals (CNNs) from $P_i^{g,new}$

*FIG. 3*

Ground Truth

Noisy Input /23.37 dB

BM3D /27.12 dB

DnCNN /36.60 dB

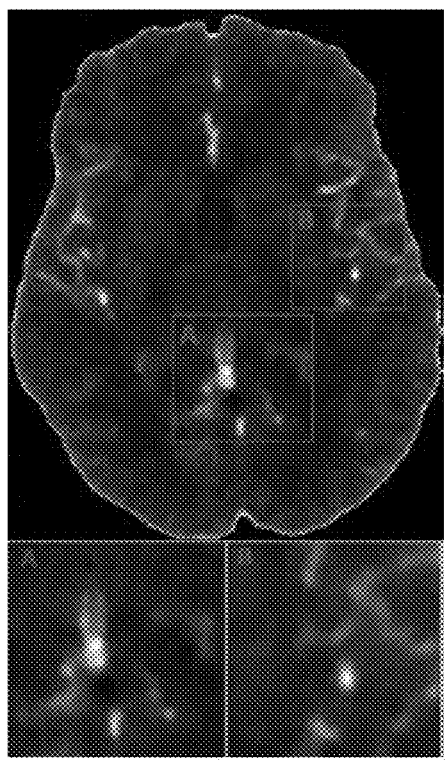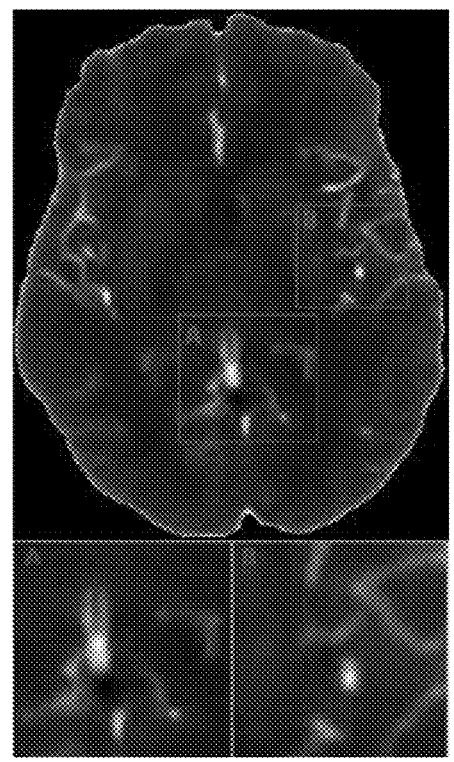
EvoNet-5 /36.47 dB
*FIG. 6E*
EvoNet-17 /36.69 dB
*FIG. 6F*

EvoNet-block /36.90 dB

US 11,069,033 B2

NEURAL NETWORK EVOLUTION USING EXPEDITED GENETIC ALGORITHM FOR MEDICAL IMAGE DENOISING

CROSS-REFERENCE TO RELATED APPLICATION

This application claims the benefit of and priority to U.S. Provisional Patent Application No. 62/728,995 entitled "NEURAL NETWORK EVOLUTION USING EXPEDITED GENETIC ALGORITHM FOR MEDICAL IMAGE DENOISING," filed Sep. 10, 2018, the contents of which being incorporated by reference in their entirety herein.

STATEMENT REGARDING FEDERALLY SPONSORED RESEARCH OR DEVELOPMENT

This invention was made with government support under 1758430 awarded by the National Science Foundation. The government has certain rights in the invention.

BACKGROUND

Medical imaging techniques, such as computed tomography (CT), magnetic resonance imaging (MM), and X-rays are popular in medical diagnostics. Nevertheless, these imaging techniques, among others, are often susceptible to "noise." Noise may include flaws in the medical imaging due to non-ideal imaging conditions or randomly occurring artifacts that often arise. As can be appreciated, noise reduces the visibility of objects in a medical image that are beneficial in medical diagnostics. For example, CT perfusion images are commonly associated with complicated mixed noise due to photon starvation artifacts. In recent decades, different methods have been investigated to address noise arising in medical imaging, such as spatial filtering and patch similarity. However, various types of noise in medical images still provide unsatisfactory medical imaging.

BRIEF SUMMARY OF THE INVENTION

Various embodiments for image denoising using a convolutional neural network (CCN) are described. In one embodiment, a system may include at least one computing device and program instructions stored in memory and executable in the at least one computing device that, when executed, direct the at least one computing device to perform a genetic algorithm (GA) routine that identifies and optimizes hyperparameter(s) for use in denoising an image using the convolutional neural network. An image may be denoised using the convolutional neural network, where the image is denoised using the hyperparameter(s) identified and optimized in the genetic algorithm routine.

In some embodiments, the image may include a medical image, such as a magnetic resonance imaging (MRI) image, a computed tomography (CT) image, or an X-ray image. Further, the genetic algorithm routine may utilize a fitness score determined for each set of the hyperparameters. The fitness score may include a restored image quality metric determined using a fitness function. In some embodiments, the genetic algorithm routine may include a selection operation, a crossover operation, and a mutation operation.

Further, the at least one computing device may be directed to optimize the genetic algorithm routine by splitting a set of all possible hyperparameters into (i) a fine-gene set and (ii) a complementary-gene set, where the fine-gene set comprises at least one hyperparameter selected from a prior convolutional neural network. In some embodiments, the first population of the genetic algorithm routine may be initialized based on the fine-gene set; and a mutation operation may be performed using the complementary-gene set. The at least one computing device may be further directed to implement a transfer learning routine by performing the genetic algorithm routine a first dataset and applying at least one hyperparameter identified from a result of the first dataset to a second, larger dataset.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is an example of a pseudocode routine for identifying hyperparameters to implement a convolutional neural network in medical image denoising according to various embodiments of the present disclosure.

FIGS. 6A-6G are graphs showing visual results of a perfusion computed tomography (CT) dataset with spatially correlated, normally distributed noise at standard deviation level $\sigma=22$.

DETAILED DESCRIPTION

Figure 1:
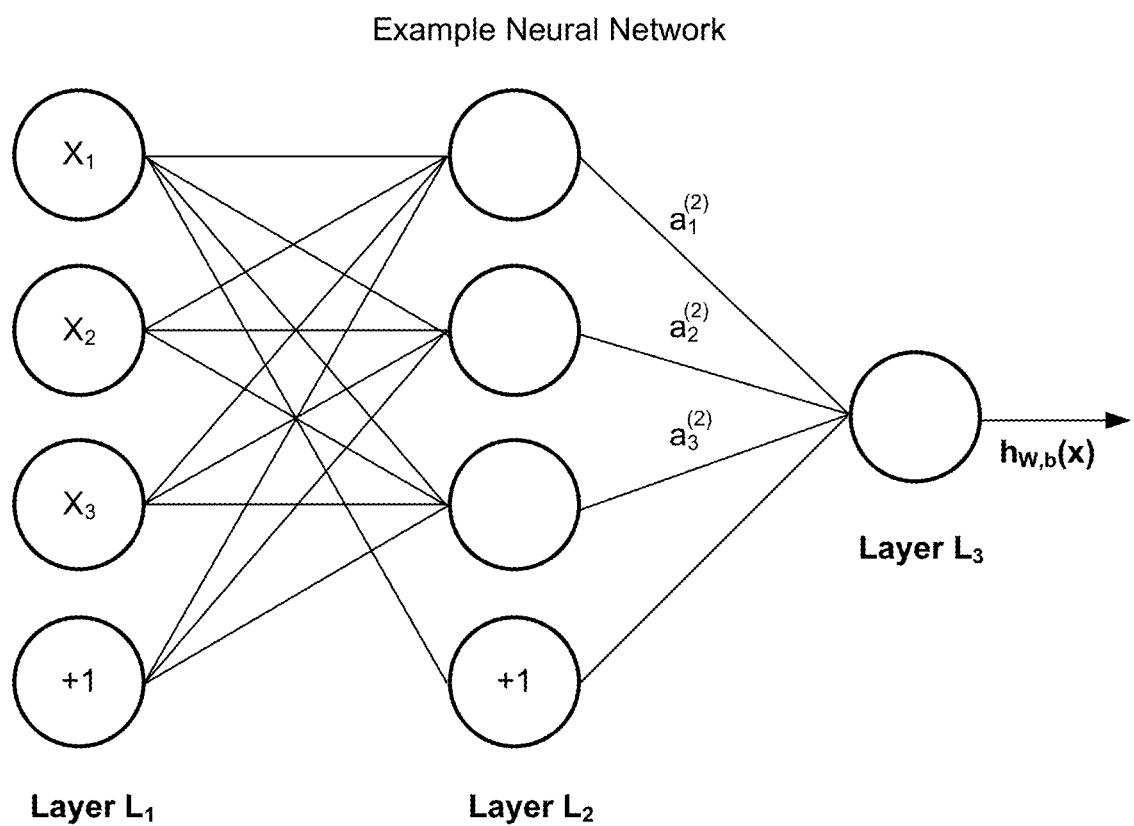
FIG. 1 is an example drawing showing a neural network according to various embodiments of the present disclosure.

The present disclosure relates to medical imaging denoising and, more specifically, to identifying ideal neural network hyperparameters for denoising images using a genetic algorithm (GA). Notably, convolutional neural networks (CNNs) have shown great performance over traditional models when performing various tasks. A typical convolutional neural network is composed of several stacked layers, which includes layer connections and hyperparameters. Hyperparameters generally include variables which determine a structure of a neural network as well as to how a neural network is trained. For instance, hyperparameters for a neural network may include a number of layers, a number of neurons in each layer, a type of activation function, as well as other variables. Hyperparameters play an important role in achieving optimal image denoising while being computationally efficient.

Although some neural networks exist that perform image restoration, they are manually designed based on empirical knowledge. As such, prior neural networks for image denoising are computationally expensive and slow when manually searching for optimal network structures, mainly due to the exponential combinations of hyperparameters and layers connections. To address this issue, various embodiments described herein provide for automatically constructing a convolutional neural network image denoiser with concise layer connections and optimal hyperparameter combinations. Moreover, an efficient algorithm is described to identify optimal convolutional neural networks structures within reasonable computational time. As such, the embodiments described herein are more computationally efficient over past methods. In other words, the embodiments described herein require less computational resources, such as processor time and memory, while providing more accurate image denoising results.

Artificial intelligence in medical image analysis has been used in image denoising, lesion detection, segmentation, and classification. These tasks are important for disease diagnosis and treatment planning, as can be appreciated. Convolutional neural networks can be successful in image denoising due to manual design of an effective feature extraction component (block) and the capability of tuning a large number of hyperparameters, such as the number of layers, the number of filters, the type of nonlinear activation functions, and the choice of optimizer functions.

However, manually optimizing a convolutional neural network can take days or even weeks, which depends on the network scale and the training data properties (e.g., sparsity, noisy features). Medical imaging techniques, such as Computed Tomography (CT), Magnetic Resonance Imaging (MRI), and X-rays are popular diagnostic tools. Nevertheless, these techniques are susceptible to noise. For example, CT perfusion images are often associated with complicated mixed noise due to photon starvation artifacts. Removing these artifacts from training data can improve the learning capability of the CNN-based models and thus, boost lesion detection, classification accuracy, among other beneficial improvements. However, complicated mixed noise in medical images still leads to the unsatisfactory performance of past methods.

Convolutional neural networks have shown superior performance over traditional models in performing denoising tasks. A typical convolutional neural network comprises several stacked layers, including layer connections and hyperparameters (e.g., the number of layers, the number of neurons in each layer, the choice of activation functions, among other parameters). RED-Net, for example, consists of a chain of 30 convolutional layers and symmetric deconvolutional layers. Another method, DnCNN, adopts concise stacked-layer connections, but achieves impressive performance via appropriate hyperparameters. Consequently, hyperparameters play a dominant role in optimizing image denoising tasks.

These modern networks present promising image restoration performance; however, they are all manually designed based on expert empirical knowledge. It is expensive and slow to manually search for optimal network structures with exponential combinations of hyperparameters and layer connections. To address this issue, it is beneficial to have a framework that can automatically construct promising CNN-based denoisers with concise layer connections and optimal hyperparameter combinations. Moreover, an efficient algorithm is essential to explore the optimal convolutional neural network structures within reasonable computational time.

Accordingly, various embodiments for image denoising using a convolutional neural network (CCN) are described herein. A system, referred to herein as EvoNet, may include at least one computing device and program instructions stored in memory and executable in the at least one computing device that, when executed, direct the at least one computing device to perform a genetic algorithm (GA) routine that identifies and optimizes hyperparameter(s) for use in denoising an image using the convolutional neural network. An image may be denoised using the convolutional neural network, where the image is denoised using the hyperparameter(s) identified and optimized in the genetic algorithm routine.

In some embodiments, the image may include a medical image, such as a magnetic resonance imaging image, a computed tomography image, an X-ray image, or other image. Further, the genetic algorithm routine may utilize a fitness score determined for each set of the hyperparameters. The fitness score may include a restored image quality metric determined using a fitness function. In some embodiments, the genetic algorithm routine may include a selection operation, a crossover operation, and a mutation operation.

Further, the at least one computing device may be directed to optimize the genetic algorithm routine by splitting a set of all possible hyperparameters into (i) a fine-gene set and (ii) a complementary-gene set, where the fine-gene set comprises at least one hyperparameter selected from a prior convolutional neural network. In some embodiments, the first population of the genetic algorithm routine may be initialized based on the fine-gene set; and a mutation operation may be performed using the complementary-gene set. The at least one computing device may be further directed to implement a transfer learning routine by performing the genetic algorithm routine a first dataset and applying at least one hyperparameter identified from a result of the first dataset to a second, larger dataset.

In some embodiments, an evolutionary process of the genetic algorithm may be optimized through an experience-based greedy exploration routine and transfer learning routine. In experiments performed consistent with the various embodiments described herein, denoising results on computed tomography perfusion (CTP) images demonstrate the capability to select the fittest genes for building high-performance neural networks, and the results compare favorably with prior methods, as will be discussed.

Turning now to FIG. 1, an example of a neural network is shown that includes "neurons," where each neuron comprises a logical unit that receives inputs $X_1$, $X_2$, $X_3$, and a +1 intercept term, and outputs $h_{W,b}(X)$. The neural network is formed by connecting several neurons, so that the output of a neuron can be the input of another, as shown in FIG. 1.

Figure 2:
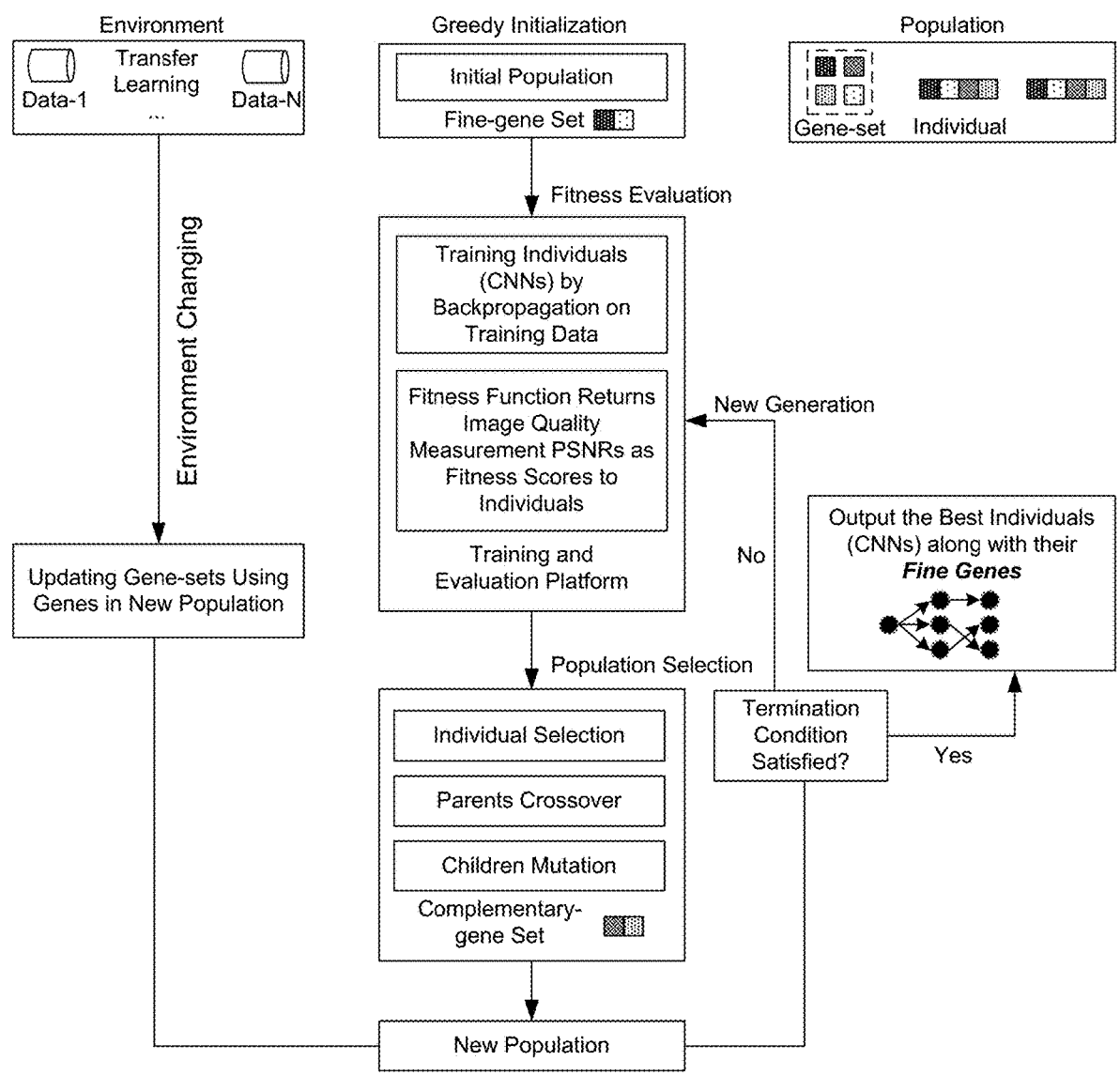
FIG. 2 is a drawing of an embodiment for fitness evaluation and population evolution in determining and optimizing hyperparameters for medical image denoising according to various embodiments of the present disclosure.

Referring next to FIG. 2, an overview of an embodiment for fitness evaluation and population evolution is shown. In some embodiments, a convolutional neural network may be trained on medical images using a fitness score. The individual networks may be labeled with the fitness scores and sent to individual selection. The surviving individuals (e.g., individuals having higher fitness metrics) are presented as parents for crossover and mutation. Multiple iterations (or generations) may be performed to identify the individuals with the highest fitness metrics.

As such, according to various embodiments described herein, a CNN-based medical image denoiser is described, herein as EvoNet, that can be generated automatically in some embodiments. To more effectively navigate large search spaces, an optimized genetic algorithm is described. Very generally, a genetic algorithm routine initializes candidate solutions (e.g., networks) as an initial generation, and then applies genetic operations to evolve the solutions in each generation. As shown in FIG. 2, for the population evolution process, three standard genetic operations may be defined: selection, crossover, and mutation.

"Genes" are at the core of a bio-evolutionary strategy as well as a CNN-evolutionary strategy. According to various embodiments, any one of the hyperparameters of a CNN are employed as a "gene", such as the number of layers, the choice of activation functions, the type of learning strategy (e.g., residual), and the choice of loss functions, as long as it has the potential to help a CNN achieve satisfactory performance. Therefore, what genes to choose and how to organize them are important for quickly constructing a CNN.

On one hand, in some embodiments, the fittest genes that have been evaluated in practice (e.g., last generation) are promoted to a fine-gene set, which has the higher priority to be chosen in the following generation. This strategy is referred to herein as an experienced-based greedy initialization strategy. On the other hand, evolutionary speed is expedited by dynamically decreasing the number of individuals (i.e., CNNs) in our population and the number of generations. Ultimately, most of the genes are eliminated, and only a few of them will survive, which includes optimal hyperparameters for image denoising.

Efficiency is still a challenge of using genetic algorithm (GA) routines in large scale training data. Genetic algorithms typically face a massive search space. Although some strategies can relieve the issue, the evolutionary process, built on extensive training data, is still quite slow. As such, according to various embodiments described herein, transfer learning can overcome this challenge. A CNN is typically designed for a specific problem on a particular dataset. A subset of that data has similar properties to the original large dataset. Therefore, the fittest genes learned from the small sub-dataset can be transferred to the original large dataset. Eventually, the efficiency issue can be solved through transfer learning, particularly, by switching evolutionary processes from a small sub-dataset to the corresponding original large dataset. The genes in the genetic algorithm routine can represent not only the hyperparameters, but also the type of structural network blocks, such as the residual block. By embedding current state-of-the-art network blocks into the evolutionary processing, the neural networks described herein outperform state-of-the-art methods.

A fitness function is formulated to help select best individuals (e.g., convolution neural networks) in each generation. Each of these solutions is evaluated by fitness scores through a denoising evaluation criteria. For instance, fitness scores can be employed to evaluate each of these solutions through a criterion of image quality, such as peak-signal-to-noise ratio (PSNR), structural similarity index measure (SSIM), etc.

Notably, FIG. 2 shows an overview of one embodiments for fitness evaluation and population evolution. In some examples, the CNN architecture may be trained on images (e.g., medical images) using a fitness score. The individual networks labeled with the fitness scores are sent to individual selection. The individuals that "survive" an iteration of the genetic algorithm (e.g., individuals having a high fitness score) are presented as parents for crossover and mutation, while individuals that "do not survive" (e.g., individuals with a low fitness score) are discarded from further evaluation.

As such, the evolution-based approach of a genetic algorithm routine provides the flexibility to optimize both CNN parameters and network structures. Additionally, the genetic algorithm may be optimized to speed up the evolutionary progress. For instance, in some embodiments, an experience-based greedy routine may be performed during the initialization stage to enrich high-performance individuals in the first generation of the genetic algorithm. In addition, an appropriate mutation rate may be selected as a trade-off between the diversity of the population (CNNs) and convergence of optimum generation.

Further, in some embodiments, hyperparameter sets may be dynamically updated to make the architectures of the population (e.g., CNNs) transferable between datasets of different sizes. Particularly, all possible hyperparameters may be split into fine-genes and complementary-genes for initialization and mutation respectively.

Genetic algorithms are inspired by the natural biological evolution. Typically, an algorithm is composed of a population P of N "individuals," and has various operations, such as initialization, individual selection, parents crossover, and children mutation, as shown in FIG. 2. A sequence of operations may be referred as an evolutionary "generation." The competition among individuals may be simulated using a fitness function that selects the fittest individuals over weaker ones. During the population evolution process, all individuals enter an iterative competition, where a new population is evolved in each generation comprising the survivors, children generated from crossover of survivors, and mutated individuals from the children. Genetic algorithms have been used as a heuristic search and optimization technique, and have been applied in machine learning approaches, function optimization, and feature selection. Neural networks are also inspired by biological matter, such as the human brain.

In accordance with various embodiments described herein, an effective CNN structure is described by focusing on exploring effective combinations of CNN hyperparameters, as opposed to structural blocks and layer connections. A significant challenge of using a genetic algorithm is how to accelerate the evolutionary process dynamically in a large search space. For instance, employing a genetic algorithm can take hours, days, or even weeks depending on the search space.

According to various embodiments described herein, to address this issue, an optimized genetic algorithm is described along with an experience-based greedy exploration routine. Pseudocode describing an example embodiment of the optimized genetic algorithm is shown in FIG. 3.

In biology, a "gene" is the basic functional unit in a biological body. However, in an artificial neural network, genes may represent hyperparameters of the neural network, such as a number of layers, a number of neurons, an activation function, and a type of optimizer. To speed up the evolutionary process, a set of all possible genes $\theta$ may be split into a fine-gene set $\theta_f$ and a complementary-gene set $\theta_c$.

The fine-gene set may include hyperparameters selected from prior CNN structures, such as DnCNN, or previous genetic algorithm generations. The genes outside of the fine-gene set may include complementary genes.

The first population may be initialized based on the fine-gene set $\theta_f$. The mutation process may be solely construction upon the complementary-gene set $\theta_c$. As such, an individual (e.g., a potential CNN implementation) may be composed of different genes, and N individuals form a population P.

In accordance with various embodiments described herein, the fittest gene may be emphasized more than the survived individuals (e.g., network structures). As such, promising genes are ensured to be passed down to offspring and the fittest individuals are more likely to be explored effectively in early generations, decreasing computation time and use of computational resources. Therefore, in various embodiments described herein, the evolution process may be accelerated by optimizing the gene search space dynamically.

As noted above, in some embodiments, an experience-based greedy exploration routine may be employed to determine how to update gene sets and terminate the evolution process. Experience may be represented in CNN hyperparameters from a last generation in the genetic algorithm. In some embodiments, experience may be transferred to the next generation of candidates. In other words, the fine-gene sets may be initialized with top-performing CNNs evolved in previous generations.

Further, in some embodiments, a transfer learning routine may be employed that allows explored CNN architectures to be transferable among training data of different sizes. For instance, a small dataset may be used first to quickly optimize a gene-set space. Thereafter, CNNs on a larger dataset may be explored by initializing a new population using the fine genes identified from the small dataset. As such, the network evolution process is further expedited.

With respect to fitness evaluation, a fitness function $F(P_i)$ may return a restored image quality metric as a fitness score to each individual $P_i$. In some embodiments, a fitness function routine may evaluate individual fitness; update gene-sets; and serve as stopping criteria or a termination condition. The pseudocode shown in FIG. 3 presents the details of an embodiment of the genetic algorithm routine for exploring CNNs to handle with medical image denoising.

Various experiments were conducted in accordance with the embodiments described herein. A dataset comprising a collection of 10,775 cerebral perfusion CT images was utilized, all of which including 512 pixel×512 pixel grayscale images. The training data D included 250 images from the perfusion CT dataset selected at random, all of which being cropped uniformly to size of 331 pixels×363 pixels. The cropping was performed as a pre-process to remove skull and background from raw CT images and improve feature learning efficiency during training. The testing data included 250 images randomly selected while having no overlap with the training data, and were implemented as 512 pixels×512 pixels grayscale images. Another 100 images with no overlap with the training data or the testing data were selected as a validation set. A Peak Signal-to-Noise Ratio (PSNR) was selected as the fitness function.

As may be appreciated, genetic algorithms require high computational resources due to a large search space, which leads to difficulties in directly evaluating performance on large datasets. As noted above, in some embodiments, CNN hyperparameter combinations may be determined by training on a small subset $D_s$. In the experiment, 35 images from the training data were randomly selected and segmented with a patch size of 50 pixels×50 pixels at a stride of 20. Therein, 8,576 image patches were generated for the initial evolution. Hyperparameters observed from the results on the subset $D_s$ were transferred to a large training set $D_1$. With the same patch size and stride length, 100 images of $D_1$ were segmented into 17,280 patches for further evolution.

Repeated scans at different radiation dose on the same patient are not desirable (and in some cases can be unethical) due to increased unnecessary radiation exposure. Therefore, in some embodiments, low-dose perfusion CT images may be stimulated and added to the regular dose perfusion CT images. Specifically, spatially correlated, normally distributed noise may be added to both training data and testing data. The added noise has a standard deviation of $\sigma=17, 22, 32$, which corresponds to the tube current-time product of 30, 20, 10 mAs. The regular dose level was 190 mAs.

In the experiment, all possible genes were selected from CNN hyperparameters with promising performance reported from prior systems. We considered a constrained case consisting of four sub-genotypes: number of layers=(1, 2, 3, 4, 5, 6, 7), number of neurons in each layer=(16, 32, 64, 96, 128, 256), activation ('ReLU', 'Tanh', 'SELU', 'ELU', 'Sigmoid'), and optimizers=('rmsprop', 'sgd', 'adam', 'adamax', 'adadelta', 'adagrad'). During initialization, the initial fine gene set $\theta_f$ from set $\theta$ was defined as number of layers=(5, 6), number of neurons in each layer=(32, 48), activation=('ReLU', 'ELU', 'Sigmoid'), and optimizers= ('sgd','adam').

An initial population size of N=20 individuals was created and genetic operations were performed for 10 rounds (i.e., 10 generations). For each generation, a mutation possibility rate was set at 0:1. Crossover occurred between any two random parents networks. After each crossover and mutation, the whole population was checked and duplicate individuals were removed, as shown in FIG. 3.

Other hyperparameters (e.g., learning rate) were defined to follow Tensorflow default settings. Residual learning was employed to accelerate training process. All genetic algorithm progresses were processed on Tensorflow platform with Geforce® GTX TITAN graphics processing units (GPUs).

Figure 4A:
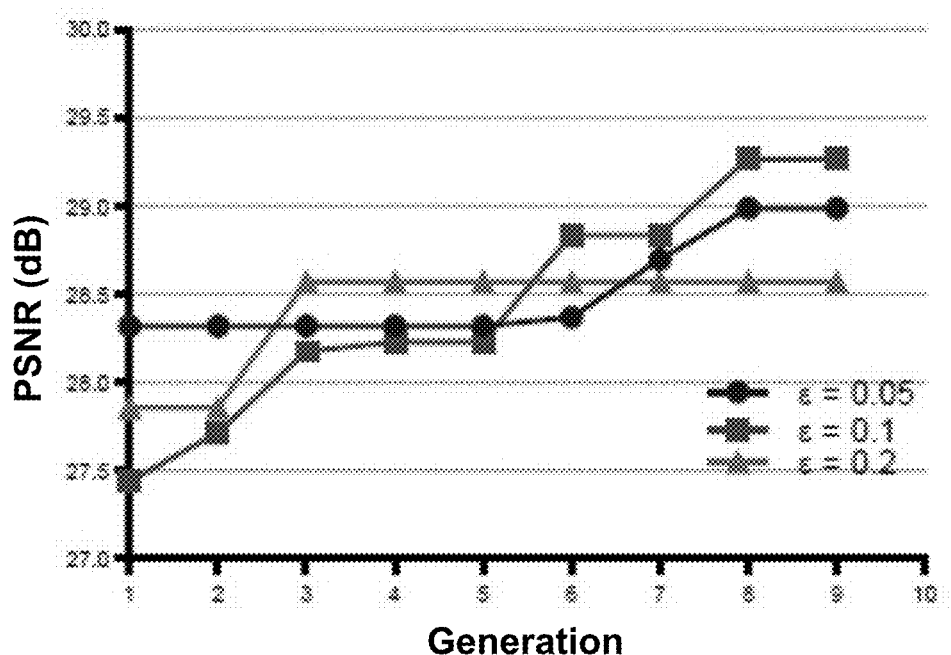
FIG. 4A is a graph showing performance of the best individuals identified from the genetic algorithm shown with respect to a mutation rate of $\varepsilon=0.05, 0.1, 0.2$ according to various embodiments of the present disclosure.

The performance of different mutation rates were evaluation, as shown in FIG. 4A. When the mutation rate was too high, the searching speed in the search space was increased, but optimal individuals in each generation were not always located. On the other hand, when the mutation rate was too low, it lead individuals to converge rapidly to local optimum as opposed to global optimum. From FIG. 4A, it can be seen that E=0:1 provided the optimal performance.

Figure 4B:
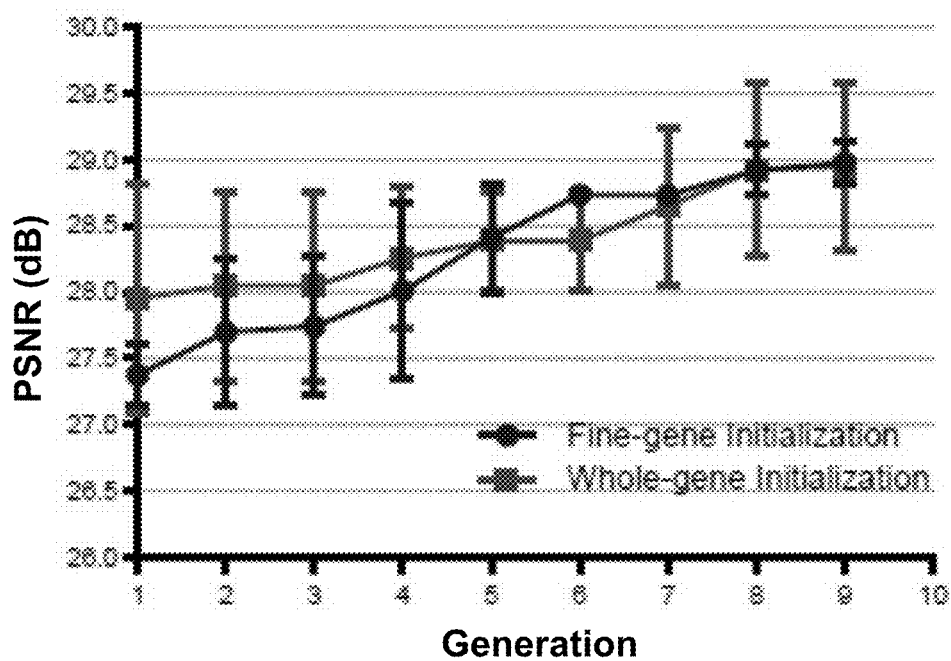
FIG. 4B is a graph showing an average performance of the top five individuals with respect to an initialization process with a fine-gene set and a whole-gene set according to various embodiments of the present disclosure.
Figure 4C:
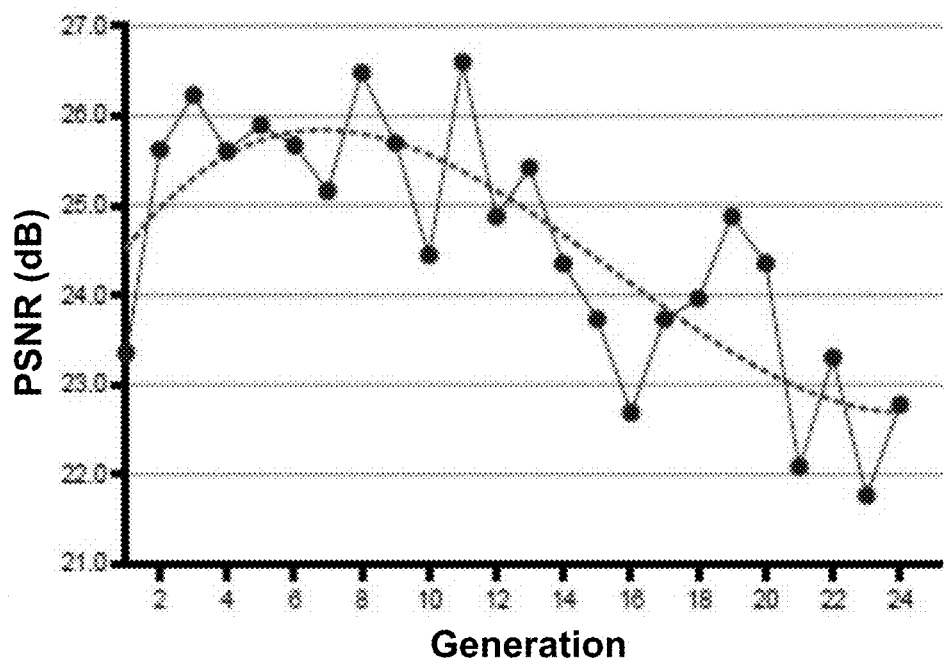
FIG. 4C is a graph showing an average performance of all individuals with respect to a generation number, where all training was performed on a large dataset according to various embodiments of the present disclosure.

Different initialization strategies were evaluated as well. As can be seen in FIG. 4B, fine-gene initialization with selected genes can reach the same performance as the whole gene initialization strategy after 8 generations. While the fine-genes set was set as a greedy initialization set, it assisted early generations locate high-performance individuals. However, after certain generations, more mutation genes were introduced due to the duplicate individual elimination which increased population diversity but reduced performance. This is demonstrated in FIG. 4C which helped stop the genetic algorithm at an optimal generation and improve search efficiency. Also shown in FIG. 4C, 10 generations were used.

Figure 5A:
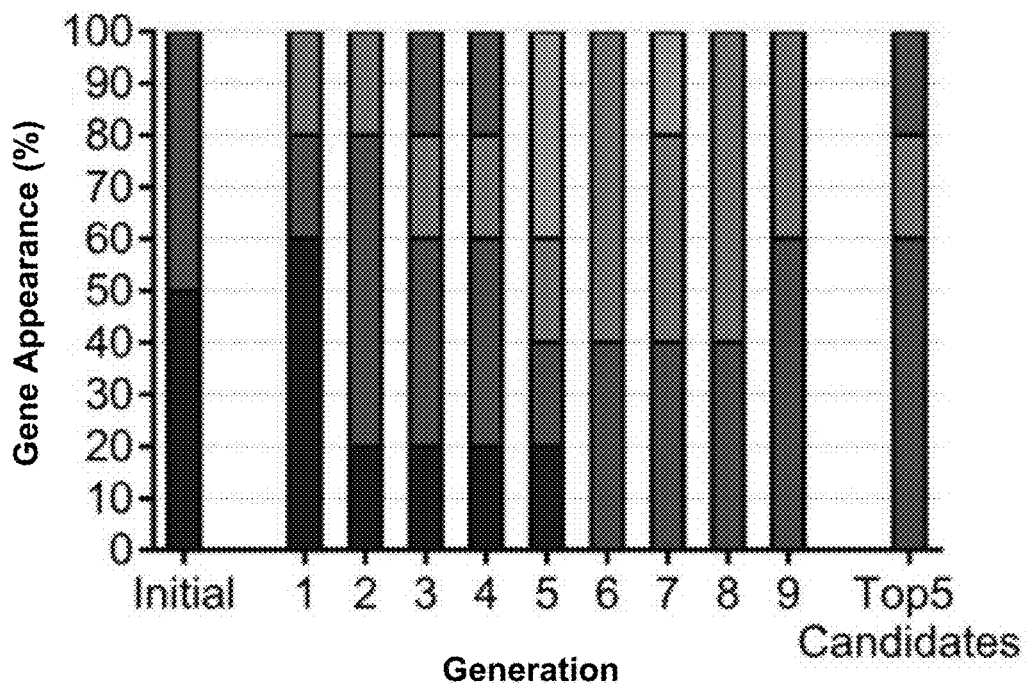
FIGS. 5A-5B are graphs showing a change in activation gene appearance during evolutionary progress n on a small dataset and a large dataset with a transferred initialization set according to various embodiments of the present disclosure.
Figure 5B:
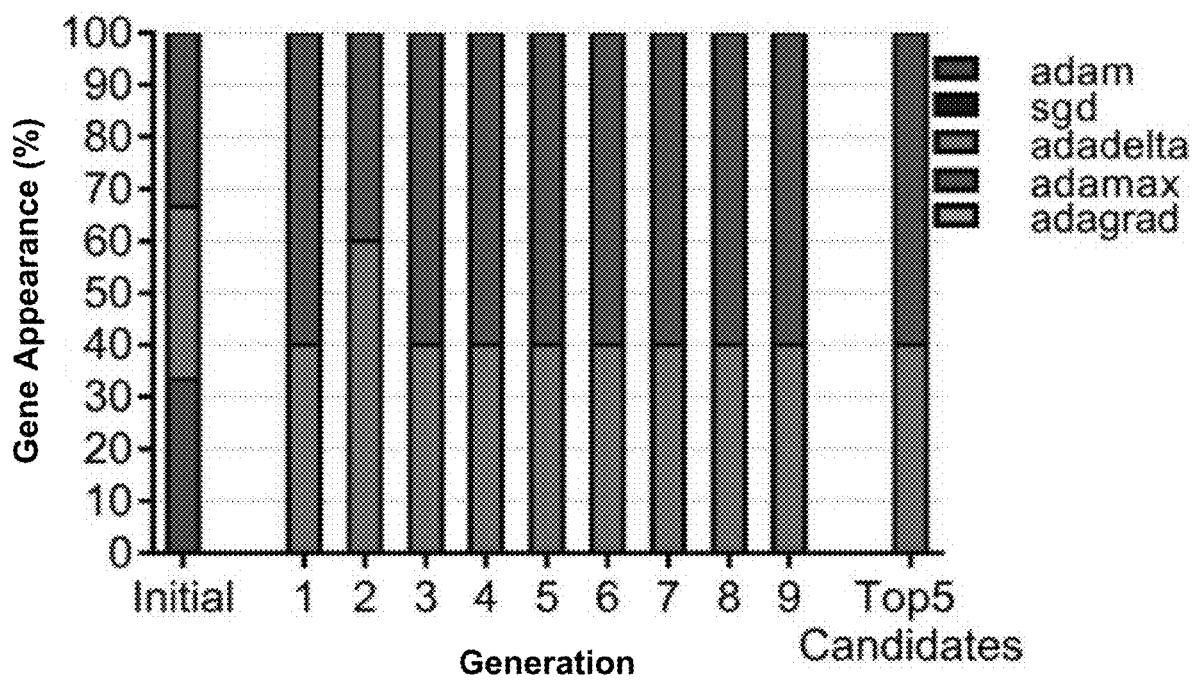

The evolution of genes were tracked over generations and the activation function genes are shown in FIGS. 5A-5B. Notably, the top 5 individuals in each generation trained on a small training set and after transferring to a large training set are shown. When training on a small set (FIG. 5A), low-performance genes are eliminated over the generations, such as sgd and adagrad. At the same time, high-performance genes are introduced from mutation, such as adadelta.

After being transferred to a large training set (FIG. 5B), the initialization set was transferred from FIG. 5A, where good "genes" such as adam, adadelta, and adamax, were preserved. Through the evolution, top performing genes, such as adamax and adadelta, dominated the activation functions genes. The tracking process demonstrates that the greedy initialization strategy helps to efficiently search for high-performing genes, while reducing overall computation time and complexity. Also importantly, it illustrates that the learned CNN hyperparameters (genes) and structures are transferable from small datasets to large datasets.

Both quantitative and qualitative comparisons with prior image denoising techniques were conducted in the experiment. Notably, the embodiments described herein were compared with BM3D and DnCNN. The EvoNet-5 experiment included 5 layers, 64 neurons each layer, adadelta, ReLu) from $D_s$, and the EvoNet-17 experiment included 17 layers, 64 neurons each layer, adadelta, ReLu, from $D_1$.

In Table 1, the summary of the quantitative results are shown, with the best performances being emphasized in bold. The deeper EvoNet-block and EvoNet-17 w outperform other methods with PSNR on the testing dataset. The shallow EvoNet-5 achieved comparable performance to DnCNN, however, it is deep (20 layers) while the EvoNet-5 is a concise structure with stacked convolutional layers without regularization technique.

During the first experiment, deeper (6, 7 layers) and larger (128, 256 neurons) networks are eliminated due to overfitting on small data. Therefore, the number of blocks in the second experiment were initialized with a small number to save computing resources and speed up evolution processing. FIGS. 6A-6G shows the visual results. EvoNet, the method described herein, perfectly restores physiological structures, circuit contour, and texture of the cerebral cortex and gains high PSNR values, which matches quantitative results.

The flexibility of our evolutionary framework can find a better combination of components of a neural network that is suitable for the target task. In Table 1, as one can see, EvoNet-block has much better performance than EvoNet-17 that is obtained from stacking convolutional layers without involving state-of-the-art network blocks. Taking advantage of existing CNN components is a promising strategy to explore better network architectures.

Figure 6A:
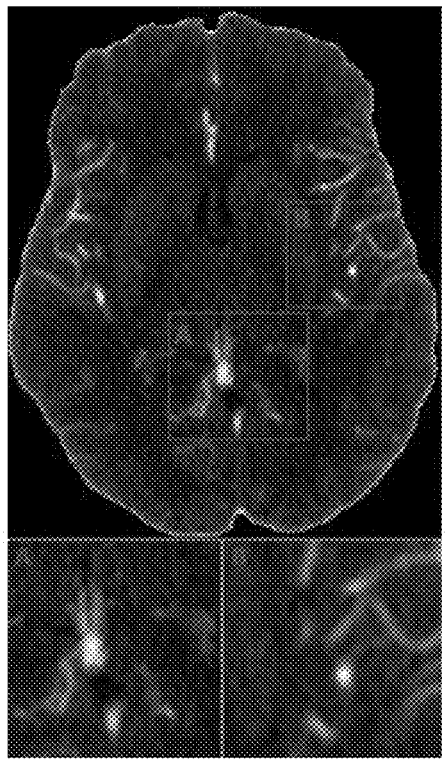
Figure 6B:
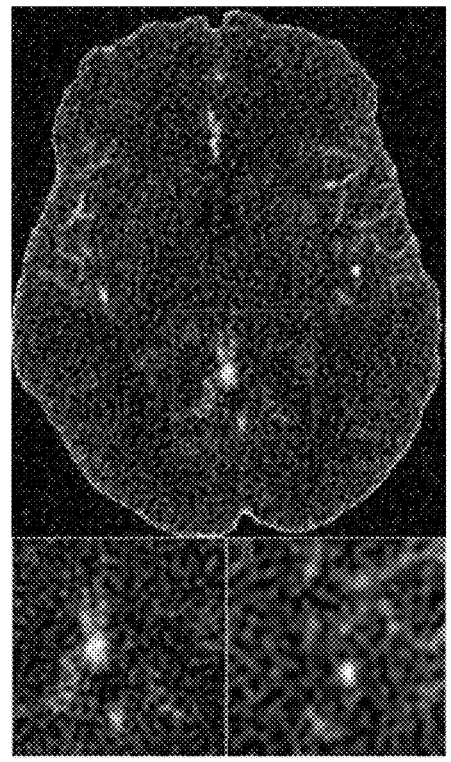
Figure 6C:
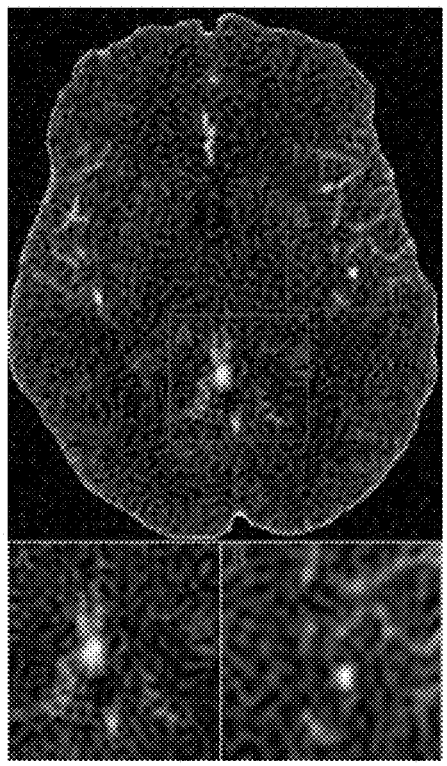
Figure 6D:
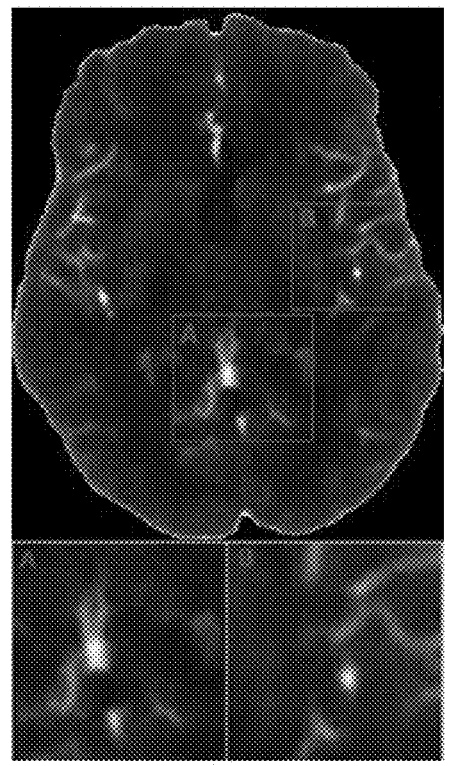
Figure 6G:
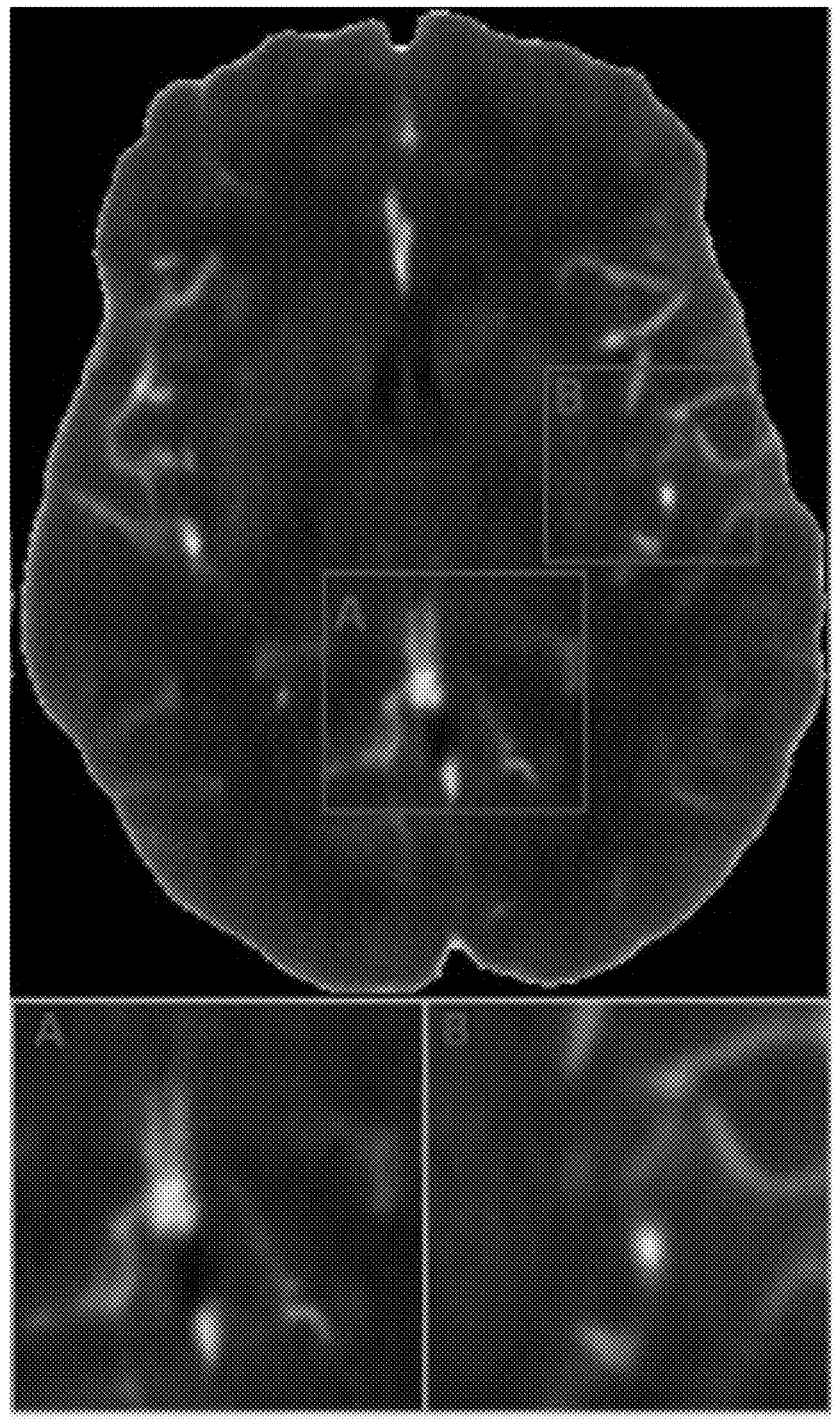

Again, FIGS. 6A-6G shows visual results of the experiments, with regions of interest emphasized and scaled up for better visual comparison. Notably, according to the embodiments described herein, physiological structures were perfectly restored, as shown in FIGS. 6E, 6F, and 6G. Additionally, circuit contour and texture of the cerebral cortex were restored and desirable PSNR values were achieved, matching the quantitative results.

Figure 7:
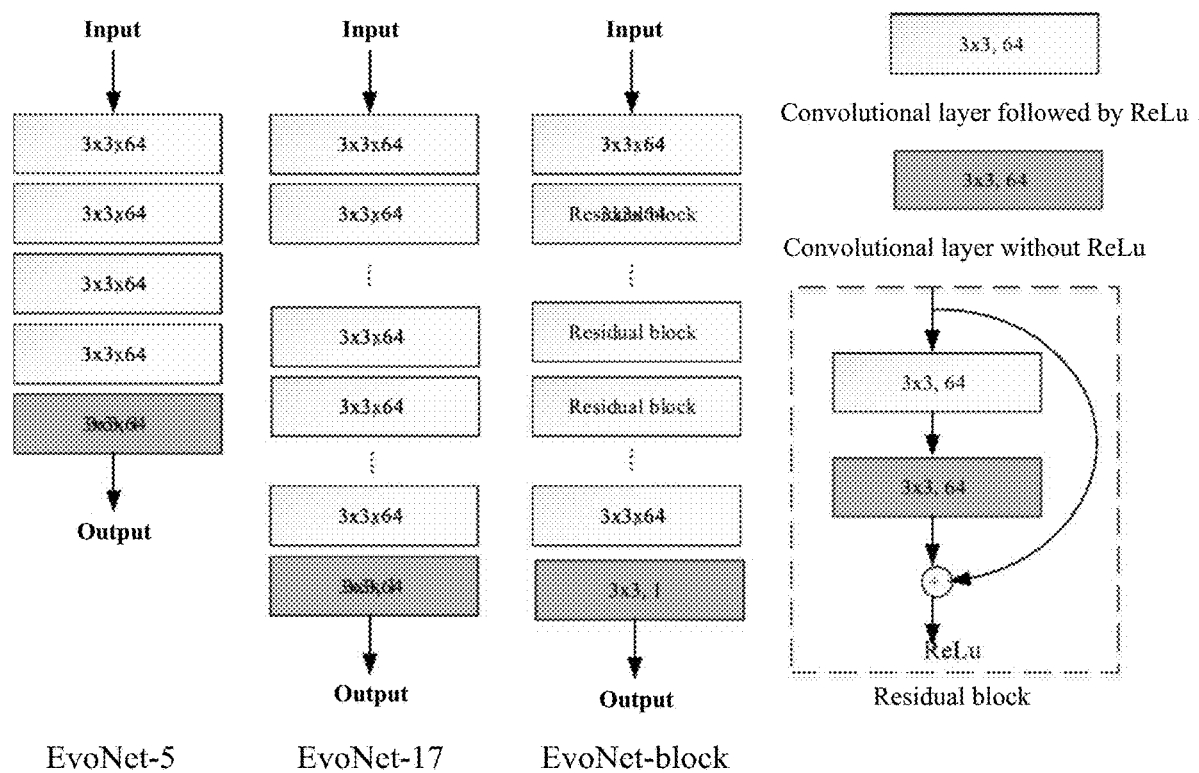
FIG. 7 is a schematic diagram illustrating a visualation of architectures of EvoNet-5, EvoNet-17, and EvoNet-block according to various embodiments of the present disclosure.

In addition, in various experiments, the EvoNet-block was obtained by involving the types of network blocks and trained on $D_1$. EvoNet-block has 21 layers (9 residual blocks and additional 3 layers for input-end and outputend), 64×39×3 neurons in each layer, meaning absolute error as the loss function, Adam as the optimizer, residual as the learning strategy, and Tanh as the activation function. The architectures of EvoNet-5, EvoNet-17, and EvoNet-block are shown in FIG. 7.

Figure 8:
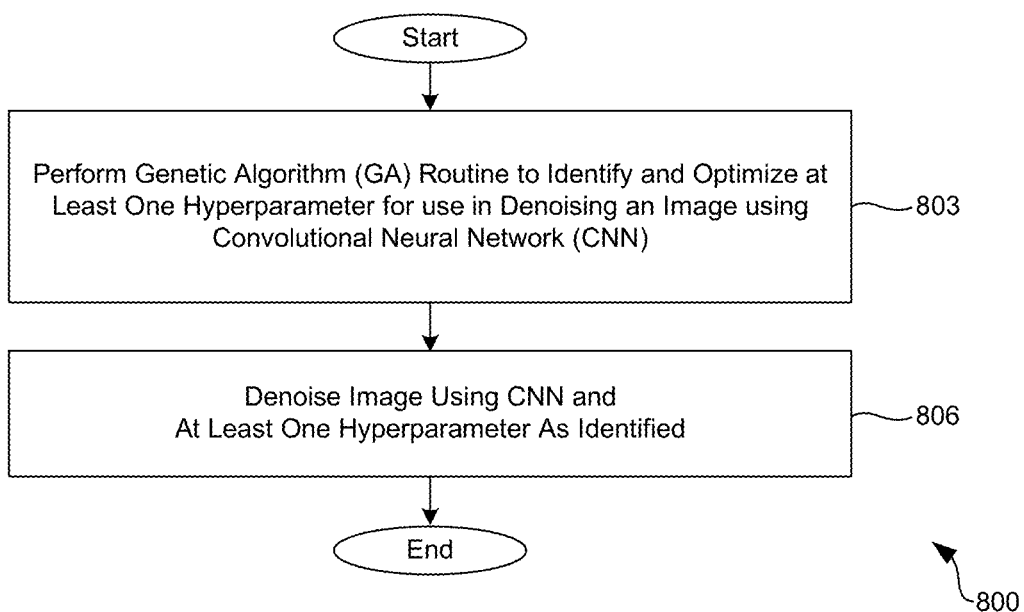
FIG. 8 is a flowchart illustrating an example of a computer-implemented method for image denoising according to various embodiments of the present disclosure.

Turning now to FIG. 8, a flowchart 800 is shown comprising a computer-implemented method for denoising an image, such as a medical image. The computer-implemented method, in step 803, includes performing a genetic algorithm routine to identify and/or optimize at least one hyperparameter for use in denoising an image using a convolutional neural network. Thereafter, in step 806, the computer-implemented method includes denoising an image using the convolutional neural network and at least one hyperparameter as identified or optimized in step 803.

In conclusion, an optimized genetic algorithm routine is described to explore CNN structures for medical image denoising. An experience-based greedy exploration routine was described along with transfer learning that accelerates genetic algorithm evolution. The embodiments described herein were experimented with perfusion CT datasets, and promising performance was achieved. The embodiments described herein may be implemented to explore more flexible CNN structures for challenging tasks, such as tumor detection.

TABLE 1

Average PSNR, SSIM, and computation time of algorithms: BM3D, DnCNN, EvoNet-5, and EvoNet-17 at different noise levels σ = 17, 22, 32.

| | BM3D | | DnCNN | | EvoNet-5 | | EvoNet-17 | | EvoNet-block | |
|---|---|---|---|---|---|---|---|---|---|---|
| σ | PSNR(dB) | SSIM | PSNR(dB) | SSIM | PSNR(dB) | SSIM | PSNR(dB) | SSIM | PSNR(dB) | SSIM |
| 17 | 29.07 | 0.4515 | 36.64 | 0.9158 | 36.30 | 0.9062 | 36.05 | 0.9074 | 36.91 | 0.9170 |
| 22 | 26.98 | 0.3578 | 35.87 | 0.8863 | 35.66 | 0.8914 | 35.92 | 0.8988 | 36.18 | 0.9037 |
| 32 | 23.95 | 0.2385 | 35.03 | 0.8671 | 34.35 | 0.8578 | 35.04 | 0.8846 | 35.35 | 0.8879 |

Figure 9:
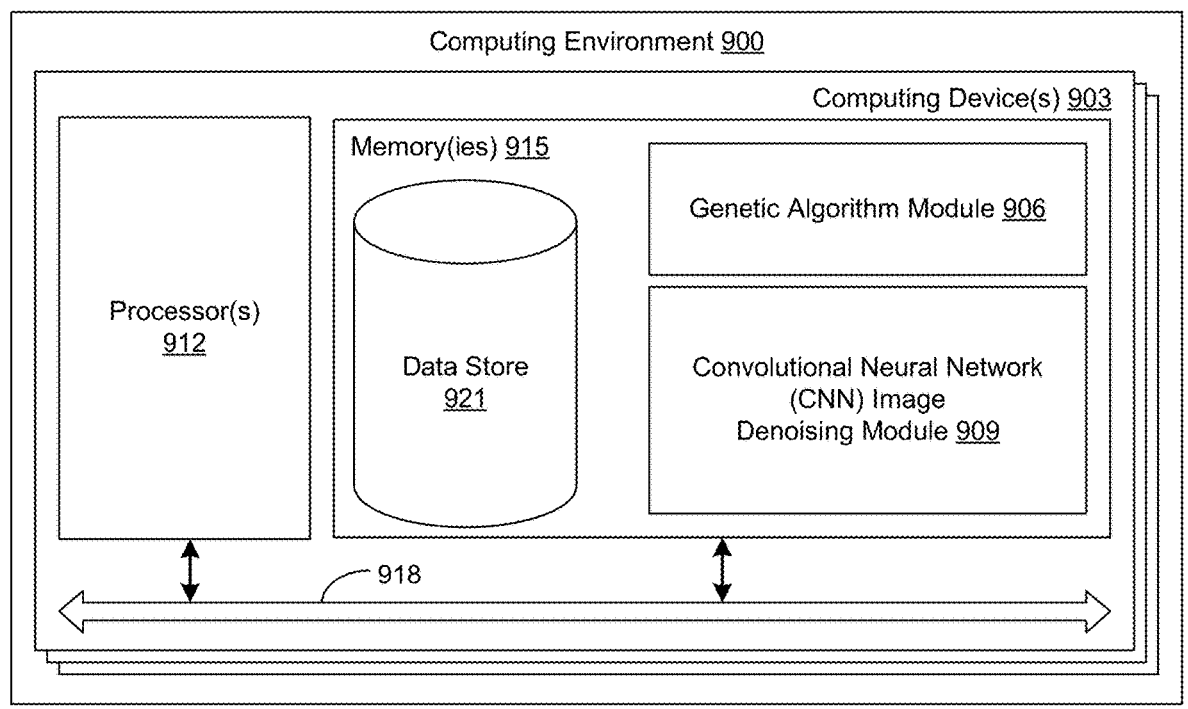
FIG. 9 is an example computer architecture for performing the computer-implemented method for image denoising according to various embodiments of the present disclosure.

Turning now to FIG. 9, an example computing architecture is described that includes a computing environment 900 having one or more computing devices 903. To perform the embodiments described herein, the computing devices 903 can include a genetic algorithm module 906, a convolutional neural network image denoising module 909, as well as other services, applications, or modules. The computing devices 903 that implement the neural networks, the genetic algorithm routines, or other computer-implemented method described herein can include at least one processor circuit, for example, having a processor 912 and at least one memory device 915, both of which can be coupled to a local interface 918, respectively. The computing device 903 can include, for example, at least one computer, a mobile device, smartphone, personal computer, server, or like device. The local interface 918 can include, for example, a data bus with an accompanying address/control bus or other bus structure.

Stored in the memory device 915 are both data and several components that are executable by the processor 912. In particular, stored in the one or more memory devices 915 and executable by the device processor 912 can include a client application and potentially other applications. Also stored in the memory can be a data store 921 and other data.

The data store 921 can include hyperparameters identified by the genetic algorithm module 906, for example, as well as noisy or denoised images.

A number of software components are stored in the memory 915 and executable by a processor 912. In this respect, the term "executable" means a program file that is in a form that can ultimately be run by the processor 912. Examples of executable programs can be, for example, a compiled program that can be translated into machine code in a format that can be loaded into a random access portion of one or more of the memory devices 915 and run by the processor 912, code that can be expressed in a format such as object code that is capable of being loaded into a random access portion of the one or more memory devices 915 and executed by the processor 912, or code that can be interpreted by another executable program to generate instructions in a random access portion of the memory devices 915 to be executed by the processor 912. An executable program can be stored in any portion or component of the memory devices 915 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although various systems described herein can be embodied in software or code executed by general-purpose hardware as discussed above, as an alternative the same can also be embodied in dedicated hardware or a combination of software/general-purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code stored and accessible from memory that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program instructions, program code, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semi-conductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for image denoising using a convolutional neural network (CCN), comprising:
   at least one computing device comprising at least one hardware processor; and
   program instructions stored in memory and executable in the at least one computing device that, when executed, direct the at least one computing device to:
   perform a genetic algorithm (GA) routine that identifies and optimizes a plurality of hyperparameters for use in denoising an image using the convolutional neural network (CNN), wherein at least one of the plurality of hyperparameters identified and optimized comprises a number of layers, a number of neurons in each layer, and a type of activation function to be employed in the convolutional neural network (CNN); and
   denoise an image using the convolutional neural network (CCN), wherein the image is denoised by the convolutional neural network (CNN) using the plurality of hyperparameters identified and optimized in the genetic algorithm (GA) routine.

2. The system of claim 1 wherein the genetic algorithm (GA) routine utilizes a fitness score determined for each set of the plurality of hyperparameters.

3. The system of claim 2, wherein the fitness score is a restored image quality metric determined using a fitness function.

4. The system of claim 1, wherein the genetic algorithm routine is configured to perform at least one of: a selection operation, a crossover operation, and a mutation operation.

5. The system of claim 1, wherein the at least one computing device is further directed to split a set of all possible hyperparameters into (i) a fine-gene set and (ii) a complementary-gene set, where the fine-gene set comprises at least one other hyperparameter selected from a prior convolutional neural network.

6. The system of claim 5, wherein:
a first population of the genetic algorithm routine is initialized based on the fine-gene set; and
a mutation operation is performed using the complementary-gene set.

7. The system of claim 1, wherein the at least one computing device is further directed to implement a transfer learning routine by performing the genetic algorithm routine on a first dataset and applying the hyperparameters as identified from a result of the first dataset to a second dataset, wherein the second dataset is larger than the first dataset.

8. The system of claim 1, wherein the image is a medical image, the medical image comprising a magnetic resonance imaging (MRI) image, a computed tomography (CT) image, or an X-ray image.

9. The system of claim 1, wherein:
the at least one of the plurality of hyperparameters identified and selected is a first subset of the plurality of hyperparameters; and
a second subset of the hyperparameters comprises at least one of: a number of filters, a type of nonlinear activation function, and a choice of optimizer function to be employed in the convolutional neural network (CNN).

10. The system of claim 1, wherein the at least one computing device is further directed to optimize an evolutionary process of the genetic algorithm (GA) using at least one of an experience-based greedy exploration routine and a transfer learning routine.

11. A computer-implemented method, comprising:
performing, by at least one computing device that comprises at least one hardware processor, a genetic algorithm (GA) routine that identifies and optimizes a plurality of hyperparameters for use in denoising an image using the convolutional neural network (CNN), wherein at least one of the hyperparameters identified and optimized comprises a number of layers, a number of neurons in each layer, and a type of activation function to be employed in the convolutional neural network (CNN); and
denoising, by the at least one computing device, an image using the convolutional neural network (CCN), wherein the image is denoised by the convolutional neural network (CNN) using the hyperparameters identified and optimized in the genetic algorithm (GA) routine.

12. The computer-implemented method of claim 11, further-comprising utilizing, by the at least one computing device, a fitness score determined for each set of the plurality of hyperparameters in the genetic algorithm (GA) routine.

13. The computer-implemented method of claim 12, further comprising:
determining, by the at least one computing device, a restored image quality metric using a fitness function; and
selecting, by the at least one computing device, the restored image quality metric as the fitness score.

14. The computer-implemented method of claim 11, further comprising performing, by the at least one computing device in the genetic algorithm (GA) routine, at least one of: a selection operation, a crossover operation, and a mutation operation.

15. The computer-implemented method of claim 11, further comprising splitting, by the at least one computing device, a set of all possible hyperparameters into (i) a fine-gene set and (ii) a complementary-gene set, where the fine-gene set comprises at least one other hyperparameter selected from a prior convolutional neural network.

16. The computer-implemented method of claim 15, wherein:
a first population of the genetic algorithm routine is initialized based on the fine-gene set; and
a mutation operation is performed using the complementary-gene set.

17. The computer-implemented method of claim 11, further comprising:
implementing, by the at least one computing device, a transfer learning routine by performing the genetic algorithm (GA) routine on a first dataset and applying the hyperparameters as identified from a result of the first dataset to a second dataset, wherein the second dataset is larger than the first dataset.

18. The computer-implemented method of claim 11, wherein the image is a medical image, the medical image comprising a magnetic resonance imaging (MRI) image, a computed tomography (CT) image, or an X-ray image.

19. The computer-implemented method of claim 11, wherein:
the at least one of the plurality of hyperparameters identified and selected is a first subset of the plurality of hyperparameters; and
a second subset of the hyperparameters comprises at least one of: a number of filters, a type of nonlinear activation function, and a choice of optimizer function to be employed in the convolutional neural network (CNN).

20. The computer-implemented method of claim 11, further comprising optimizing, by the at least one computing device, an evolutionary process of the genetic algorithm (GA) using at least one of an experience-based greedy exploration routine and a transfer learning routine.

* * * * *